April 21, 1964 P. D. JOHNSON 3,130,341

RAPID RESPONSE SEMICONDUCTORS

Filed May 27, 1960 2 Sheets-Sheet 1

Inventor:
Peter D. Johnson,
by John F. Ahern
His Attorney.

April 21, 1964 P. D. JOHNSON 3,130,341
RAPID RESPONSE SEMICONDUCTORS
Filed May 27, 1960 2 Sheets-Sheet 2
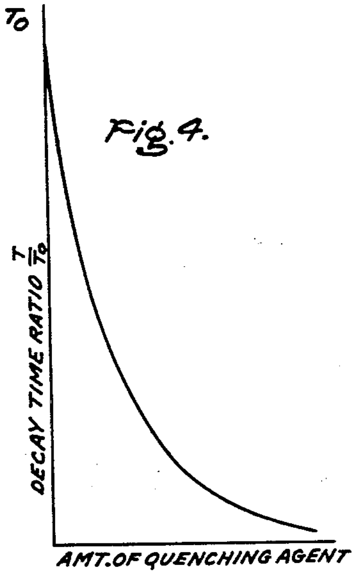
Fig. 4.
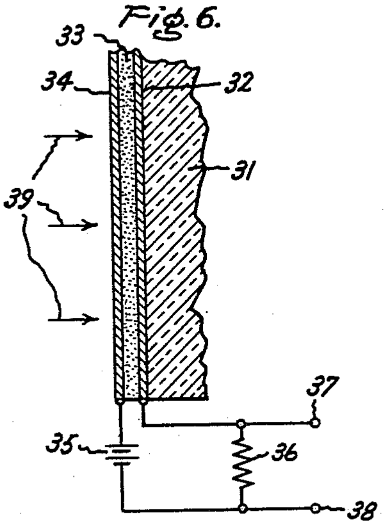
Fig. 6.
Fig. 5.
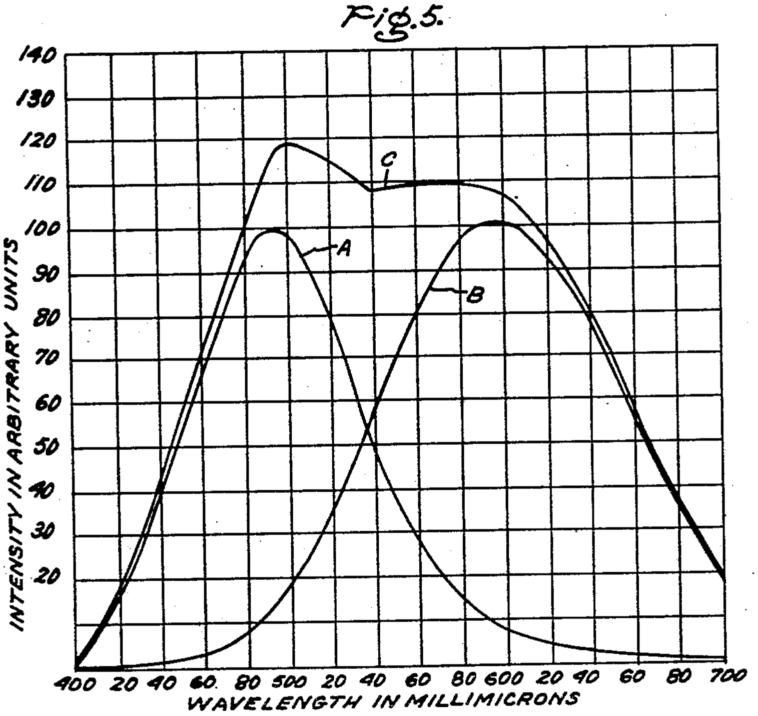
Inventor:
Peter D. Johnson,
by John F. Ahern
His Attorney.

United States Patent Office 3,130,341

Patented Apr. 21, 1964

3,130,341

RAPID RESPONSE SEMICONDUCTORS

Peter D. Johnson, Schenectady, N.Y., assignor to General Electric Company, a corporation of New York Filed May 27, 1960, Ser. No. 32,391
5 Claims. (Cl. 313—92)

The present invention relates to rapid response semiconducting materials. More particularly, the invention relates to rapid response phosphors and rapid response photoconductors and to screens and devices embodying such materials.

This is a continuation-in-part of my copending application, Serial No. 616,860, filed October 18, 1956, now abandoned.

A semiconductor is a material which is intermediate to the good conductors such as metals, and insulators. Some of the greatest advantages derived from semiconductors are the result of energy changes within the semiconductors. When energy is added to the semiconductors, as for example, by incident electromagnetic or cathode ray radiation, non-equilibrium conditions prevail and useful results may be attained thereby. Two such useful results are luminescence and photoconduction. Luminescence results from the excitation of impurity centers within a semiconductor to a state of high energy. When the semiconductor, after a finite time, again returns to its stable, low energy state, a photon of visible light may be emitted resulting in luminescence. In photoconduction, the excitation of the semiconductor by incident radiation, as for example, visible light, releases conduction electrons from their bound state in the semiconductor host lattice and, with these conduction carriers available, the electrical resistivity of the material is, for a finite time, reduced. In both luminescence and photoconduction, the effect is transient and lasts for a brief period of time. In utilizing phosphors and photoconducting semiconductors, it is desirable, in many applications, that the recovery times thereof be reduced to an absolute minimum.

The greatest need for rapid response luminescent semiconductors or phosphors arises in systems wherein the light emitted by a phosphor screen is detected or sensed by a photosensitive device. As used herein the term "sensing" shall be understood to refer to the act of detecting the presence of, and giving a varying indication of, the intensity of emitted light.

In the development of television pickup and similar systems wherein the emission of an excited phosphor screen is sensed by photosensitive means with a very fast recovery time, the need has become increasingly greater for cathode ray tubes and phosphor screens therefor having rapid rates of decay of fluorescence intensity. One example of this need is shown by the nature of the cathode ray "flying-spot" scanning tube, wherein the tube screen is scanned by a constant intensity cathode ray beam controlled by a raster sweep. This type sweep is commonly used in television camera and viewing tubes, and causes a beam of electrons to sweep horizontally across the face of the tube screen at high velocity. After each transverse scanning motion the beam is deflected slightly in a vertical direction and another horizontal line is scanned. This process is repeated until a rectangular pattern has been scanned upon the face of the tube screen. The beam of electrons is then returned to its original vertical position and the scanning process is repeated. Each complete rectangular pattern conveys the information which portrays one complete picture. In the flying-spot scanner, the scanning electron beam successively excites adjacent phosphor portions of the tube screen, and the fluorescent light radiation from the excited portions is focused by a light focusing system upon an object to be viewed or a transparent film to be reproduced. Light transmitted through, or reflected from, the viewed object is focused upon a photosensitive device, the photo-current of which is modulated to carry a signal which transmits an image of the viewed object.

In order that a steady picture may be transmitted, the raster sweep must contain as many well-defined pictures per second as will be consistent with the vision persistency of the human eye which eventually views the image. A standard value usually used for this purpose comprises 30 pictures per second. Other values of the standard raster sweep used comprise 525 lines per picture, and a total of approximately $3 \times 10^6$ picture elements per second. Thus for a flying-spot color television scanner, the time interval between the excitation of adjacent phosphor elements of the order of $0.3 \times 10^{-6}$ seconds or 0.3 microsecond. In the ordinary television picture tube, wherein the luminescent emission is viewed with the human eye, there is an apparent continuity in the viewed picture, due to the vision persistency of the human eye, which can detect no change which occurs more rapidly than in 20 or 30 milliseconds.

In the flying-spot cathode ray tube, however, where the luminescent emission is viewed by a rapidly-recovering photo-sensitive device, the intensity of fluorescent emission of each picture element of the scanner tube should decay to a small fraction of its initial intensity within a period of the order of several tenths of a microsecond. This need is not limited to flying-spot type cathode ray tubes but exists in other similar devices sensed photoelectrically, rather than visually. At the present time, cathode ray tubes used in color viewing systems are not capable of responding to high velocity scanning in order to produce optimum unblurred images. This deficiency of present cathode ray tubes is particularly pronounced when phosphors with three distinct color components are used to produce blue, green and red fluorescent light emission. Tubes using the best available phosphors for each of the three colors must employ phosphors having fluorescent light decay rates ranging from 0.3 to 3.0 microseconds. With a diversity in decay rates, additional circuits are required to compensate for the variation. To be practicable for flying-spot scanner and similar uses, phosphors should have a decay rate of 0.3 microsecond or less.

Similar needs exist for rapid-response photoconducting semiconductors. One such use is in image intensifying screens of the type described and claimed in U.S. Patent No. 2,650,310 to W. C. White, and assigned to the assignee of the present invention. In such a device, a pattern of radiation is incident upon a photoconducting screen and the change in resistivity of discrete portions of the photoconducting screen raises the voltage impressed upon the contiguous discrete regions of a spaced electroluminescent cell, causing an intensified visual image to be produced thereby. In order that such devices possess maximum utility, it is desirable that as soon as a discrete region of the photoconducting screen ceases to be illuminated, the resistivity thereof should rise very rapidly, preferably within 0.3 microsecond, to its initial unilluminated resistivity.

One object of the invention, therefore, is to provide luminescent phosphors, the fluorescent luminous intensity of which decays at an initially rapid rate.

A further object of the invention is to provide cathode ray tube screens comprising phosphors which emit fluorescent light having components in all portions of the visible spectrum, the intensities of which components decay at very rapid rates, all of which rates are of the same order of magnitude.

Another object of the invention is to provide, for use in cathode ray tubes, a phosphor screen having a rapid rate of initial decay of fluorescent intensity, and having a band of emission which includes the entire visible spectrum.

An additional object of my invention is to provide, for cathodoluminescent screens, red emitting phosphors having faster initial fluorescent light decay rates than have been heretofore attainable.

Still another object of the invention is to provide photoconducting semiconductors having extremely rapid recovery rates.

Briefly stated, in accord with my invention, luminescent phosphors and photoconducting semiconductors, for use in cathode ray tubes and other electronic devices, are provided having extremely rapid recovery rates. The luminescent phosphors of the invention comprise composite phosphors having an emission spectrum with components in all portions of the visible spectrum, all of which exhibit rapid decay rates of initial fluorescence. The photoconductors of the invention exhibit rapid recovery times. The foregoing results are achieved by the addition, to luminescent phosphors and photoconducting semiconductors, of minute quantities of quenching agents which introduce radiationless processes into the semiconductors and result in rapid rates of decay of fluorescent light emission and rapid photoconductive recovery times.

The features of the invention which are believed novel are set forth with particularity in the appended claims. The invention itself, however, together with further objects and advantages thereof may best be understood with reference to the following description taken in connection with the accompanying drawings in which:

Figures 1, 2, 3:
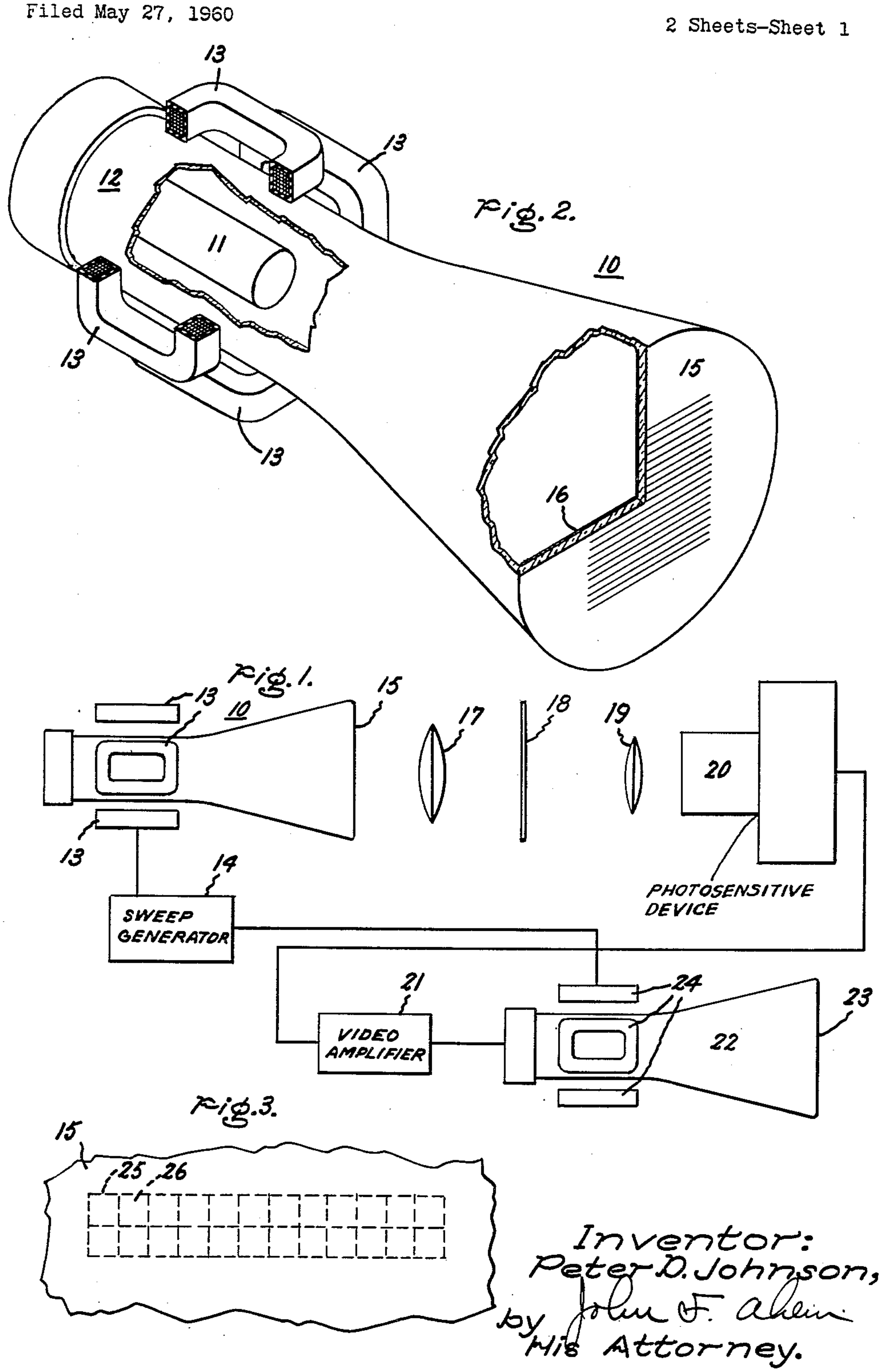
FIGURE 1 represents a television scanning system utilizing one feature of the invention.
FIGURE 2 represents a cathode ray tube utilized in the system of FIGURE 1.
FIGURE 3 represents an enlarged view of a portion of the phosphor screen of the cathode ray tube of FIGURE 2.

FIGURE 4 presents a graphic representation of the decrease of the decay time of luminous intensity of a typical phosphor material when prepared in accord with my invention;

FIGURE 5 shows graphically the spectral distribution of fluorescent light emitted by a composite phosphor screen as prepared in accord with one embodiment of my invention; and FIGURE 6 illustrates a photoconductive screen constructed in accord with another feature of the invention.

An image portraying system incorporating one feature of my invention is shown in FIGURE 1. This figure illustrates diagrammatically a "flying-spot" television scanning system in which the image contained in a photographic film 18 is converted into electrical signals which may be transmitted to a viewing tube 22. The screen 15 of a scanner tube 10 is traversed by a raster sweep controlled by sweep coils 13, which are in turn controlled by sweep generator 14. Fluorescent light emitted by screen 15 of scanning tube 10, described hereinafter, is collected and focused by a focusing means, which may be lens 17, and passed through photographic film 18. The focused light, in passing through film 18, is intensity modulated thereby and carries, by means of its modulated light intensity, the information portrayed on film 18. This modulated light is then collimated by a focusing means, which may conveniently be lens 19, and directed upon a light sensitive device which may be photosensitive tube 20. The photosensitive device then senses the received light, that is, tube 20 acts to detect the intensity of the modulated light received thereby, and transforms the modulated light into a varying electrical signal voltage which is transmitted to video amplifier 21 and applied to a control electrode of viewing tube 22. Viewing tube 22 has associated therewith a set of sweep coils 24 which are controlled by sweep generator 14. Sweep coils 24 produce a raster sweep pattern on the face 23 of viewing tube 22. This raster sweep is synchronized with the raster sweep applied to scanner tube 10 by coils 13. The signal voltage applied to the control electrode of viewing tube 22 modulates the electron beam whose position on the face 23 of viewing tube 22 is controlled by sweep coils 24 so as to reproduce the information contained on photographic film 18 upon the face 23 of viewing tube 22.

A scanning tube which may be used in the system of FIGURE 1 is represented generally as 10 in FIGURE 2. Scanning tube 10 includes means for producing a beam of electrons which may be electron gun 11, and a screen 15 which includes a cathodoluminescent phosphor 16, described in detail hereinafter.

Referring now to FIGURE 3 where a portion of screen 15 is reproduced, it may be seen that this screen, although continuous, may be considered to be composed of a number of adjacent picture elements 25 and 26, etc., which are the smallest elements of screen 15 whose emitted light may be sensed individually, due to the frequency response limitation of video amplifier 21. When picture element 25 is excited by a scanning electron beam, it emits light of a characteristic color which passes through film 18 and impinges upon photosensitive tube 20 with a certain intensity. In a very short time, the sweep moves the electron beam to picture element 26 and the light emitted by a picture element 26 likewise eventually falls upon photosensitive tube 20. The time taken for the sweep of the electron beam to pass from picture element 25 to picture element 26 is extremely short, being of the order of tenths of a microsecond. In order that the system illustrated in FIGURE 1 produce a well-defined picture upon the face of viewing tube 22 the intensity of the fluorescent light emitted by picture element 25 should fall to a very low value with respect to its initial fluorescent intensity during the time taken for the electron beam to pass from picture element 25 to picture element 26. If this does not occur, the photosensitive tube 20 senses not only the emitted light from picture element 26, but also some residual light from picture element 25. This residual light would tend to blur the image produced upon phototube 20 and detract from picture contrast. It is, therefore, evident that for such a system as the flying-spot scanner, or similar systems, wherein the light emitted by a luminescent material is to be sensed by photosensitive means having no perceptible recovery time, very rapid initial decay rates of fluorescent luminous intensity are necessary.

Heretofore, attempts to develop phosphors having fast rates of decay of fluorescent light have been in the nature of combining particular host-activator groups, seeking combination which possessed an inherently fast decay rate. According to my invention, I utilize a different approach to the problem, and introduce additional agents to host-activator combinations to cause faster decay rates. For example, I have found that the decay rate of zinc-cadmium-sulfo-selenide cathodoluminescence phosphors may be greatly increased without substantially decreasing the intensity of fluorescent radiation by adding a small quantity of fluorescence-quenching agent such as nickel to the phosphor before firing.

The basis of the increased decay rates of the phosphors used in the improved information portraying system in FIGURE 2 may be understood by a brief review of some fundamental concepts of luminescence in solids. Generally, pure inorganic solids do not luminesce. Most solid inorganic luminescent material are "impurity activated" semiconductors, that is selected impurities are introduced to a relatively pure host material. The region surrounding and including such an impurity becomes an "activator center" and electrons in this region may occupy energy levels which do not exist in the pure host crystal. Electrons in the centers of activation are raised to high energy levels when excited by cathode rays. When an electron is raised to such an energy level, it is unstable and may return to the unexcited state and emit a photon of energy ($h\nu$), where $h$ is Plank's constant and $\nu$ is the photon frequency which is characteristic of the particular host-impurity combination. This process continues during excitation by cathode rays, and, if the wavelength of the emitted photon is within the visible spectrum, visible luminescence results. When excitation of an activator center ceases, electrons in the unstable, elevated energy levels of the solid rapidly return to equilibrium levels and fluorescence decays and disappears. The intensity of emission I at any time $t$ from an excited phosphor is known to be proportional to the number of exicted centers remaining at a time $t$. If the only mechanism for deexcitation of luminescent centers is the emission process, then $$\frac{I}{I_0}=\frac{N}{N_0}=e^{-At} \quad (1)$$

where A is the transition probability for emission. This expression represents the exponential decay curve for fluorescent emisison. If, however, there is a competing radiationless process occurring at a rate K' then $$dN/dt=-AN-K'N \quad (2)$$

and $$\frac{I}{I_0}=e^{-(A+K')t} \quad (3)$$

Thus, the decay constant is changed from A to $(A+K')$. The term "radiationless process" includes all processes by which energy is dissipated other than by visible light emisison.

My invention proposes the deliberate introduction of one or more radiationless processes in which K' is equal to or greater than A so as to increase the decay rate according to the equations quoted. The addition of nickel to impurity activated sulfides and selenides induces such radiationless processes which detract from the initial fluorescent radiation and cause a shorter decay period.

In addition to the above-described radiation, phosphors, like most other solid materials, possess "electron traps" which may capture electrons which have been excited by an incident cathode ray beam. When excitation ceases, the trapped electrons gradually escape to the activator, with the emission of photons of visible light. This process is a slow one in comparison to the initial decay of fluorescence, and often may be seen by the human eye. The intensity of this emitted light is usually much lower than the intensity of the initial fluorescent radiation. This phenomena is commonly known as "after-glow" or phosphorescence. Due to its long persistency, such radiation, which may linger for periods of seconds after deexcitation, bears no relevance to the problem of decreasing the rate of initial decay of fluorescent light emission in a system such as herein described where such radiation is sensed electronically. In such systems, phosphorescent after-glow is merely represented by a steady unidirectional component to the varying photocurrent of the phototube 20, which does not affect picture contrast. Such radiation is not to be confused with the initial decay of fluorescence, the decay time of which may be decreased according to my invention.

The graph of FIGURE 4 shows the decrease of decay time for a typical zinc-cadmium sulfide phosphor combination, relative to the decay time ($T_0$) of the untreated phosphor, with the addition of increasing quantities of quenching impurity.

I have found that luminescent phosphors having decay rates of 0.2 microsecond or less may be obtained by the addition of from 10 to 20 parts per million of nickel by weight of the host semiconducting phosphor present. For a phosphor having a decay rate of less than 0.2 microsecond the minimum quantity of impurity additive which produces this result is 10 parts per million. Higher amounts than 20 parts per million may be utilized, however, the addition of such great amounts of impurity to the luminescent phosphor results in a decrease in luminescence intensity and may require the addition of a greater amount of luminescence activator. Thus as the percentage of nickel increases, for optimum performance, the percentage of silver or copper activator, for example, must increase. For a range of from 10 to 20 parts per million of nickel, the percentage of silver or copper may vary from 0.01 to 1.0% by weight of the host phosphor. For optimum brightness and decay time, I prefer to use from 10 to 12 parts per million of nickel and an activator-to-nickel weight ratio of approximately 50 to 150.

A number of phosphors which may be used to produce the improved results of the invention have been prepared, and the composition and decay rates thereof are presented in the following table. For the purpose of comparing phosphor decay times, this parameter is defined as the time required for fluorescent light intensity to fall to a value of $$\frac{1}{e}$$

of its initial excited value after cessation of excitation.

*Table I*

| Sample No. | ZnS | CdS | Ag | Ni | Decay Time, μsec. |
|---|---|---|---|---|---|
| 1080–21 | .35 | .65 | .001 | 0.0 | 11.6 |
| 1080–23 | .35 | .65 | .001 | .000005 | 0.56 |
| 1080–24 | .35 | .65 | .001 | .00001 | 0.08 |
| 1080–25 | .35 | .65 | .001 | .000015 | 0.06 |
| 1080–26 | 35 | .65 | .001 | .00002 | 0.06 |
| 1080–27 | .35 | .65 | .00005 | 0.0 | 29.5 |
| 1030–30 | .35 | .65 | .00005 | .00001 | 0.13 |
| 1080–31 | .35 | .65 | .00005 | .000015 | 0.09 |
| 1080–32 | .35 | .65 | .00005 | .00002 | 0.09 |
| 1080–33c | .35 | .65 | .0015 | 0.0 | 9.0 |
| 1080–34c | .35 | .65 | .0016 | .000002 | 2.0 |
| 1080–35c | .35 | .65 | .0017 | .000005 | 0.24 |
| 1080–36c | .35 | .65 | .0017 | .00001 | 0.06 |
| 1080–37c | .35 | .65 | .0020 | .000015 | 0.07 |
| 1080–38c | .35 | .65 | .0019 | .00002 | 0.06 |

As may be seen from the above table, the decay rates of the quenched phosphors are much shorter than those of the unquenched phosphors (Sample 1080–21, 1080–27, and 1080–33*c*). The increase in decay rate is as great as a factor of 3000. Most of these decay times are less than 0.1 microsecond. As far as is known, these are the only inorganic phosphors having emission in the visible spectrum which exhibit such short decay times.

Available cathode ray tubes are particularly deficient, as far as fluorescent light decay time is concerned, in the red portion of the visbile spectrum. Since the presence of high cadmium percentages favor red emission, my improved phosphors are more poticeably superior to the presently available phosphors with respect to red emission. While the embodiment of my invention concerning luminescent phosphors is directed to the production of electronically sensed information portraying systems and cathode ray tubes therefor having screens with fast decay rates of fluorescence in all portions of the visbile spectrum, it is particularly directed to such devices having fast decay characteristics in the red portion of the visible spectrum, namely, that portion of the visible spectrum having a wavelength from 5500 A.U. to 7000 A.U. Fast-decay phosphors exhibiting this emission comprise a solid solution of zinc and cadmium salts selected from the group consisting of sulfides and selenides with the cadmium salts being present in the range of 50 to 80 percent by weight. One example of such a mixture is the zinc-cadmium sulfide phosphor the emission spectrum of which falls within this range and is illustrated in curve B of FIGURE 5 and described in detail below.

FIGURE 5 presents the typical spectral distribution curve of several zinc-cadmium sulfide phosphors and illustrates one feature of the invention. Curve A represents the emission spectra of a solid solution of 30% cadmium sulfide and 70% zinc sulfide activated with silver. This phosphor exhibits a blue-green emission when excited by cathode rays. Curve B represents the emission spectral distribution of a solid solution of 65% cadmium sulfide and 35% zinc sulfide activated with silver. The emission of this phosphor under cathode rays has a characteristic yellow-orange color. A sample of this phosphor quenched with 10 parts per million of nickel showed a decay time of 0.08 microsecond. (Sample 1080–24.) Curve C represents the emission spectral distribution of a cathode ray tube screen composed of mixtures of equal portions of the above two phosphors. This curve is peaked in the region of maximum sensitivity and possesses useful components in all portions of the visible spectrum. The rates of luminescent decay of both phosphor components of such a screen are of the order of less than a microsecond. Other combinations of phosphors may be made. Thus, for example, percentages of zinc and cadmium in any one phosphor preferably may vary from 20 to 80% cadmium and from 80 to 20% zinc in the sulfide. The proportions of the different phosphors used may be varied to increase or decrease the influence of any one component. Although several examples are given herein, many variations may be used and in fact any proportions or combinations of zinc and cadmium salts selected from the sulfide and selenide groups may be used, the specific combination and proportion depending upon the particular application.

As an example of the preparation of a fast decay phosphor according to my invention, the following method may be followed. Mix 350 g. of high purity "luminescent grade" zinc sulfide with 650 g. of the same purity cadmium sulfide in a porcelain crucible. Add, by pipette, solutions containing 1.30 gm. of silver nitrate and 0.015 gm. of nickel nitrate. Add 20 gm. of sodium chloride as a flux and mix the constituents thoroughly. Evaporate the mixture at moderate temperature until completely dry. Grind the dry mixture with a non-metallic mortar and pestle. The mixture may then be fired at a temperature of approximately 700° C. in a silica tray in an atmosphere of nitrogen plus a few percent of hydrogen sulfide for approximately one hour to form a solid solution. Temperatures above 700° C. are to be avoided to prevent vaporization of the cadmium sulfide and a consequent change in phosphor composition. After firing, the material is cooled and washed in distilled water to remove the excess sodium chloride flux. After drying, the material may be ground again and, singly or in combination with other phosphors, applied to screen 20 in any conventional manner, as, for example, by spraying in a volatile solvent.

The addition of increasing percentages of quenching agents causes an attendant decrease in luminous intensity. However, this feature is compensated for by decrease in decay time. The signal-to-noise ratio, which is a measure of the utility or a so-called "figure of merit" of a flying-spot cathode ray tube, is proportional to the 1/2 power of the luminescent intensity, and is inversely proportional to the 3/2 power of the decay time. Additionally, greater percentages of quenching agents can be added to cathode ray tubes which are photoelectrically sensed than to those which are viewed visually, as the extreme sensitivity of electronic sensing devices can easily compensate for loss of luminous intensity.

Photoconducting semiconductors which possess a rapid response rate to their initial resistivity, in the order of 0.2 microsecond or less, are prepared in accord with another feature of my invention. As mentioned herebefore, in photoconductors the photon-caused decrease in the resistivity of photoconducting semiconductors is due to photon-released electrons which increase the conductivity thereof. The addition of minor portions of a photoconductivity quenching impurity such as nickel to photoconducting semiconductors in accord with the inveniton facilitates the rapid return of these photon-released electrons to their normal bound states upon de-excitation.

In FIGURE 6 of the drawing a photoconductive cell embodying the improved fast-response photoconductors of the invention is illustrated schematically. In FIGURE 6, cell 30 comprises a transparent base plate 31, a first transparent conducting layer 32, a layer of photoconductive material 33 and a second transparent conducting layer 34. A source of operating potential represented generally by battery 35 and a load resistance 36 are connected in series circuit relationship between conducting films 32 and 34. The output of the cell is taken between terminals 37 and 38 across output resistance 36. When no light is incident upon cell 30 a reference current flows through resistance 36 and photoconducting cell 30. When incident radiation represented by arrows 39 falls upon photoconductive cell 30 the resistivity of cell 30 is decreased and this results in an increasing flow of current through resistance 36 and the development of a higher voltage between terminals 37 and 38.

All of the elements of photo-cell 30 of FIGURE 6 are conventional with the exception of photoconductor 33. Photoconductor 33 may be of many physical configurations, for example, it may be composed of a mosaic of single crystals. It may also be a homogeneous vapor-deposited photoconductive layer prepared by the method disclosed and claimed in the application of D. A. Cusano, Serial No. 525,159, filed July 29, 1955, and assigned to the present assignee. Layer 33 may also comprise a mass of micro-crystals of photoconductive material suspended in a suitable binder and sprayed into position.

The photoconductive material comprising layer 33 may be any material from the zinc-cadmium sulfo-selenide family comprising zinc sulfide, cadmium sulfide, zinc selenide and cadmium selenide, or any mixtures of solid solutions thereof or any material having the same crystalline structure. To the host photoconductive material there is added, in accord with the invention, from 10 to 20 parts per million and preferably from 10 to 12 parts per million by weight of nickel. The addition of nickel to the host photoconductor lattice results in the introduction of additional energy levels into the semiconductor crystal lattice not present in the pure host material. These impurity introduced energy levels act as recombination centers at which the photon-released electrons within the photoconductor may rapidly combine with electron vacancies or "positive holes" to rapidly reduce conductivity of the photoconductor substantially as soon as they are no longer irradiated by incident radiation.

The rapid response photoconductors of the invention have many advantages. Thus, for example, by selection and adjustment of the concentration of the quenching impurity added thereto, a decay rate may be chosen to suit any particular need. Additionally, the spectral sensitivity of the photoconductors may be adjusted by varying the ratio of the components of the host phosphor. Thus, for example, if a photoconductor is desired which is highly sensitive to long wavelength emission it may comprise mainly cadmium sulfide with a minor component of zinc sulfide added thereto. If, on the other hand, the photoconductor is desired to have maximum response to short-wavelength radiation it may comprise primarily zinc sulfide with a minor component of cadmium sulfide added thereto.

Photoconductors of the invention may be prepared in accord with standard photoconductor preparation techniques. Thus, for example, to prepare a rapid response photoconductor in accord with the invention, mix 350 grams of high purity luminescent grade zinc sulfide with 650 grams of the same purity cadmium sulfide in a porcelain crucible. Add by pipette a water solution of 0.015 gram of nickel nitrate. Evaporate the mixture at a moderate temperature until completely dry. Grind the dry mixture with a non-metallic mortar and pestle. The mixture may then be fired at a temperature of approximately 700° in a silica tray in an atmosphere of nitrogen plus a few percent of hydrogen sulfide for approximately 1 hour. After firing, cool the mixture and wash in distilled water. After drying, the mixture may be ground again and applied to a conducting surface to form a photoconductive cell as illustrated in FIGURE 6.

Alternatively, to preclude the possibility of "electron traps" within the photoconductor caused by impurities therein, the photoconductor host material may be prepared conventionally, and then purified by the well-known sublimation crystal growth technique to form single crystals thereof. The single crystals may then be coated by evaporation with a measured quantity of nickel and heated to a temperature of approximately 1000° C. for a period of approximately ½ hour to completely diffuse the quenching impurity into the single crystals.

While only certain preferred embodiments of the invention have been set forth by way of illustration, many modifications and changes will immediately occur to those skilled in the art. Accordingly, I intend by the appended claims to cover all such modifications and changes as fall within the true spirit and scope of the foregoing disclosure.

What I claim as new and desire to secure by Letters Patent of the United States is:

1. In an image reproducing system wherein fluorescent light from a cathode ray tube is focused upon an image to be reproduced and light signals from said image are sensed by a photo-sensitive device, a cathode ray tube cathodoluminescent screen having a spectral distribution for emitted light with components in all portions of the visible spectrum, the fluorescent luminous intensity of which decreases to a value $$\frac{1}{e}$$

of its excited intensity in less than 0.2 microsecond after cessation of excitation, and including at least one phosphor component selected from the group consisting of zinc sulfide, zinc selenide, cadmium sulfide, cadmium selenide and mixtures and solid solutions thereof having added thereto 0.010 to 1.0 weight percent of an activator selected from the group consisting of silver and copper, and 10 to 20 parts per million of nickel.

2. In a cathode ray tube, the fluorescent radiations of which are to be sensed by a photo-sensitive electronic device, a cathodoluminescent screen comprising a transparent base plate having thereon a phosphor having a characteristic emission spectra with a maximum value at a wavelength of from 5500 to 7000 A.U., the fluorescent luminous intensity of which falls to a value $$\frac{1}{e}$$

of its excited intensity in less than 0.2 microsecond after cessation of excitation, and consisting essentially of a solid solution of zinc and cadmium salts selected from the group consisting of sulfides and selenides, said cadmium salts being present in the range of 50 to 80 percent by weight, said solid solution having added thereto 0.01 to 0.5 percent by weight of an activator selected from the group consisting of silver and copper, and 10 to 20 parts per million of nickel.

3. In a cathode ray tube the fluorescent radiation of which is sensed by a photosensitive electronic device a cathodoluminescence screen comprising a transparent base plate having thereon a phosphor having a spectral distribution of emitted light with components in all portions of the visible spectrum, the fluorescent intensity of which falls to $$\frac{1}{e}$$

of its excited intensity within 0.2 microsecond after cessation of excitation and comprising 0 to 100 percent by weight of zinc sulfide, the remainder being cadmium sulfide, said sulfide having added thereto an activator selected from the group consisting of silver and copper and 10 to 12 parts per million by weight of nickel, said luminescence activator being present within said luminescence phosphor in a ratio of 50 to 150 times the weight of the nickel present.

4. A rapid recovery cathodoluminescent phosphor consisting essentially of a material selected from the group consisting of zinc sulfide, zinc selenide, cadmium sulfide, cadmium selenide and mixtures and solid solutions thereof activated with 0.010 to 1.0 weight percent of a cathodoluminescence activator selected from the group consisting of silver and copper and containing from 10 to 20 parts per million by weight of nickel.

5. A rapid recovery cathodoluminescent phosphor consisting essentially of a material selected from the group consisting of zinc sulfide, zinc selenide, cadmium sulfide, cadmium selenide and mixtures and solid solutions thereof activated with a cathodoluminescence activator selected from the group consisting of silver and copper and containing from 10 to 12 parts per million by weight of nickel, said luminescence activator being present within said cathodoluminescent phosphor in a ratio of 50 to 150 times the weight of said nickel.

References Cited in the file of this patent

UNITED STATES PATENTS

| | | |
|---|---|---|
| 2,075,399 | Levy et al. | Mar. 30, 1937 |
| 2,096,985 | Von Ardenne | Oct. 26, 1937 |
| 2,099,023 | Levy et al. | Nov. 16, 1937 |

FOREIGN PATENTS

| | | |
|---|---|---|
| 406,957 | Great Britain | Mar. 8, 1934 |

OTHER REFERENCES

Leverenz: Luminescence of Solids, published by John Wiley & Sons, Inc., New York, N.Y., 1950, pages 149–150.